(12) United States Patent
Collins et al.

(10) Patent No.: US 7,520,047 B2
(45) Date of Patent: Apr. 21, 2009

(54) METHOD AND APPARATUS FOR LOADING A READ/WRITE HEAD TO A SPINSTAND

(75) Inventors: Graham Collins, Louvigne-du-Desert (FR); Michael Alan Miles, Rowlands Castle (GB)

(73) Assignees: Xyratex Technology Limited, Hampshire (GB); Seagate Technology LLC, Scotts Valle, CA (US)

( * ) Notice: Subject to any disclaimer, the term of this patent is extended or adjusted under 35 U.S.C. 154(b) by 233 days.

(21) Appl. No.: 11/517,570

(22) Filed: Sep. 8, 2006

(65) Prior Publication Data
US 2008/0061776 A1   Mar. 13, 2008

(51) Int. Cl.
*G01B 5/30* (2006.01)
*G11B 5/127* (2006.01)

(52) U.S. Cl. ............... 29/603.04; 73/865.9; 73/760
(58) Field of Classification Search .......... 73/760, 73/865.9; 324/212, 262; 360/75, 265.6; 29/593, 603.03, 603.04, 603.08, 603.09, 29/737
See application file for complete search history.

(56) References Cited

U.S. PATENT DOCUMENTS

| | | | |
|---|---|---|---|
| 5,315,372 A | 5/1994 | Tsai | |
| 5,696,653 A | 12/1997 | Lacey | |
| 5,774,295 A | 6/1998 | Tsai | |
| 5,786,963 A | 7/1998 | Malek | |
| 6,229,664 B1 | 5/2001 | Albrecht | |
| 6,246,662 B1 * | 6/2001 | Hearn et al. | 720/692 |
| 6,531,867 B1 | 3/2003 | Greene | |
| 6,603,629 B1 | 8/2003 | Tsai | |
| 6,867,949 B1 | 3/2005 | Guo | |
| 6,914,405 B2 * | 7/2005 | Bernard et al. | 318/611 |
| 6,930,850 B2 * | 8/2005 | Takagi et al. | 360/77.03 |
| 6,958,874 B1 * | 10/2005 | Gerrard et al. | 360/60 |
| 7,131,346 B1 * | 11/2006 | Buttar et al. | 73/865.9 |
| 7,133,244 B1 * | 11/2006 | Chang et al. | 360/77.04 |
| 7,171,845 B2 * | 2/2007 | Mate et al. | 73/105 |
| 7,221,532 B1 * | 5/2007 | Shukla | 360/75 |

(Continued)

FOREIGN PATENT DOCUMENTS

EP   530 698   3/1993

OTHER PUBLICATIONS

European Search Report dated Jul. 6, 2007, 3 pages.

*Primary Examiner*—Harshad Patel
*Assistant Examiner*—Freddie Kirkland, III
(74) *Attorney, Agent, or Firm*—Pillsbury Winthrop Shaw Pittman LLP

(57) ABSTRACT

Apparatus for loading a read/write head to a spinstand has a load area for receiving at least one head to be tested. The apparatus further has a first station having a coarse precisor arranged to provide a coarse positioning of the head. A first automation device is arranged to pick a head from the load area and to deliver it to the coarse precisor. The apparatus has a deck having a test station at which a head can be tested. The deck has a fine precisor arranged to provide a second, fine positioning of the head. A second automation device is arranged to pick a head from the first station and deliver it to the fine precisor where the head can be subjected to a second, fine precising and to pick a head from the fine precisor and to deliver it to the test station.

14 Claims, 5 Drawing Sheets

U.S. PATENT DOCUMENTS

| | | | |
|---|---|---|---|
| 7,345,842 B2 * | 3/2008 | Chang et al. | 360/77.04 |
| 2002/0018314 A1 | 2/2002 | Takano | |
| 2002/0021523 A1 | 2/2002 | Ishizuka | |
| 2002/0053251 A1 | 5/2002 | Bernard | |
| 2005/0209797 A1 | 9/2005 | Anderson | |

* cited by examiner

METHOD AND APPARATUS FOR LOADING A READ/WRITE HEAD TO A SPINSTAND

TECHNICAL FIELD

The present invention relates to a method and an apparatus for loading a read/write head to a spinstand.

BACKGROUND

It is well known to use a spinstand to test various components of a hard disk assembly, such as in particular the read/write heads and the disk media. Such tests can be carried out in a manufacturing production environment, where typically every head and a proportion of disks are tested prior to being assembled into a hard disk assembly to ensure that they perform to the required standard. Testing using a spinstand can also be carried out in a research and development setting.

A spinstand typically comprises a deck, for example of granite, which is generally isolated from external sources of vibration in some way to avoid these affecting the accuracy of the test results. A spindle is attached to the deck for holding and rotating the disk. This will typically be an air bearing spindle with an integrated DC brushless motor.

The spinstand also has a so-called "test nest" which is adapted to hold the read/write head during testing and to make electrical connections to the head. The test nest is mounted on a puck that is movable on the surface of the deck, typically on an air bearing, so as to be capable of moving the head to a desired location under the surface of the disk. The puck is typically positioned by a highly accurate x-y positional stage, also supported by air bearings and having linear encoders to allow the position of the puck to be highly accurately determined. It may also be possible to lock down the puck and/or elements of the x-y stage to the granite by application of a vacuum in order to prevent movement of the puck when in a desired position. The puck generally has some arrangement for loading/unloading the head to/from the test surface of the disk to allow the head to read from and/or write to a track of test data on the test surface of the disk. The puck also generally has some arrangement, such as a nanopositioner disposed between the puck and the test nest, for making very fine positional changes of the head relative to the test track.

When testing a head with a spinstand it is important that the head is positioned with great accuracy relative to the disk. It is therefore important that the head be loaded to the test nest with great positional accuracy. It is also important that the positioning of successively tested heads is consistently repeatable. In particular, it is important to control the x-y position of the head (i.e. the position of the head in the x-y plane parallel to the disk surface) and the theta position of the head (i.e. the rotational position of the head in the x-y plane). Discrepancies in the x-y positioning of the head affects the ability of the apparatus to position the head over a test track of data on the disk. Discrepancies in the theta positioning affects the skew of the head when positioned over a test track on the disk, which in turn affects the characterisation of the head.

When testing a read/write head with a spinstand in a production environment the test apparatus typically comprises a spinstand in combination with a receiving stage where heads are loaded and unloaded to the apparatus, and automation for moving heads between various areas in the spinstand and the receiving stage. The heads to be tested are usually delivered to the receiving stage in the form of head gimbal assemblies (HGAs) arranged in a tray. The tray will hold for example 10 or 20 HGAs arranged in a row. The automation includes a highly accurate linear actuator which extends above the relevant parts of the spinstand and has a pick device for picking up and subsequently placing down HGAs along its path.

To load a HGA to the apparatus, the linear actuator moves the pick device to above the tray which is received in the receiving stage and the pick device picks up an individual HGA. The pick device then moves the head to a so-called precisor. The precisor is normally mounted to the deck and is arranged to "precise" (or finely position) the HGA in x, y and theta positions. Since the precisor and the spindle are both registered to each other via the deck, once the HGA is finely positioned by the precisor, its position relative to the spindle and thereby to the disk are set. Once the head has been précised, the pick device picks up the HGA from the precisor and transfers it to the test nest of the puck. The test nest usually has a collet arrangement for clasping the boss hole of the base plate of the HGA in order to hold the HGA in position. The head is then loaded to the disk for testing.

A drawback of this automation is the vibration that it generates. It is important to isolate the spinstand from vibration as much as possible as vibration can affect the accuracy of the test results. It has therefore been proposed to isolate the automation from the deck of the spinstand. However, isolating the automation from the spinstand means that the automation cannot place the HGA on the precisor with the same accuracy. Also, when transferring the HGA from the precisor to the test nest with the automation, the accuracy of the fine positioning achieved by the precisor is to some extent lost when the automation is isolated from the deck.

SUMMARY

According to a first aspect of the present invention, there is provided apparatus for loading a read/write head to a spinstand, the apparatus comprising: a load area for receiving at least one head to be tested; a first station having a coarse precisor arranged to provide a coarse positioning of the head; a first automation device arranged to pick a said head from the load area and to deliver it to the coarse precisor; a deck having a test station at which a said head can be tested, the deck having a fine precisor arranged to provide a second, fine positioning of the head and the deck having a second automation device arranged to pick a said head from the first station and deliver it to the fine precisor where the head can be subjected to a second, fine precising and to pick a said head from the fine precisor and to deliver it to the test station.

This allows the coarse precisor to be used to remove the inaccuracies associated with the positioning of heads when provided to the apparatus. The deck having an additional, fine precisor allows the fine precisor to be registered to the deck and thus to the spindle and disk. This allows a very precise positioning of the head to be performed. The use of two precisors and two automation devices allows the deck to be isolated from the rest of the apparatus, whilst at the same time still gaining the precise positioning of the head by having the fine precisor and its automation on the deck.

In an embodiment, the load area and the first automation device are mechanically isolated from the deck. This allows the spinstand to be isolated from the load area and its automation, which typically acts as a source of external disturbances and vibration that may affect the performance of the spinstand.

In an embodiment, the first station is mechanically isolated from the deck.

In an embodiment, the deck has a movable stage thereon that holds the test station, the movable stage being movable from a first position on the deck where a said head can be tested to a second position on the deck for receiving a said head from the first automation device.

In an embodiment, the movable stage comprises a puck that can be locked down to the deck by application of a vacuum between the puck and the deck.

In an embodiment, the first station has a magnetic headset apparatus by which a said head can be magnetically headset when a said head is received by the coarse precisor.

In an embodiment, the first station has a deshunt device by which a said head can be deshunted when a said head is received by the coarse precisor.

In an embodiment, the first station has a tapered pin for registering with a boss hole in the base plate of a head gimbal assembly in which a said head is incorporated, and two splayed pins for receiving and guiding the suspension arm of a said head gimbal assembly there between.

In an embodiment, the fine precisor comprises a first tapered pin for being received in the boss hole of the base plate of a head gimbal assembly in which a said head is incorporated, and a second tapered pin for being received in the tooling slot of a said head gimbal assembly.

According to a second aspect of the present invention, there is provided a method of loading a read/write head to a spinstand, the spinstand comprising a deck, the method comprising: 1) transferring the head from a load area to a first station using a first automation device, the first station being a coarse precisor, the load area and the first automation device both being isolated from the deck and the coarse precisor being mounted to the deck; 2) performing a coarse precising operation on the head using the coarse precisor; 3) transferring the head from the coarse precisor to a fine precisor using a second automation device, the fine precisor and the second automation device being mounted to the deck; 4) performing a fine precising operation on the head using the fine precisor; and, 5) transferring the head from the fine precisor to a test station mounted to the deck using the second automation device.

In an embodiment, the method comprises performing a deshunt operation on the head at the first station.

In an embodiment, the method comprises performing a magnetic headset operation on the head at the first station.

In an embodiment, the steps of claim 10 are performed in the literal order 1) to 5) in relation to a single head.

In an embodiment, a first head and a second head are processed concurrently by the spinstand, steps 1) and 2) being performed on the first head concurrently with steps 3), 4) and 5) being performed on the second head.

BRIEF DESCRIPTION OF DRAWINGS

Embodiments of the present invention will now be described by way of example with reference to the accompanying drawings, in which.

DETAILED DESCRIPTION

Figure 1:
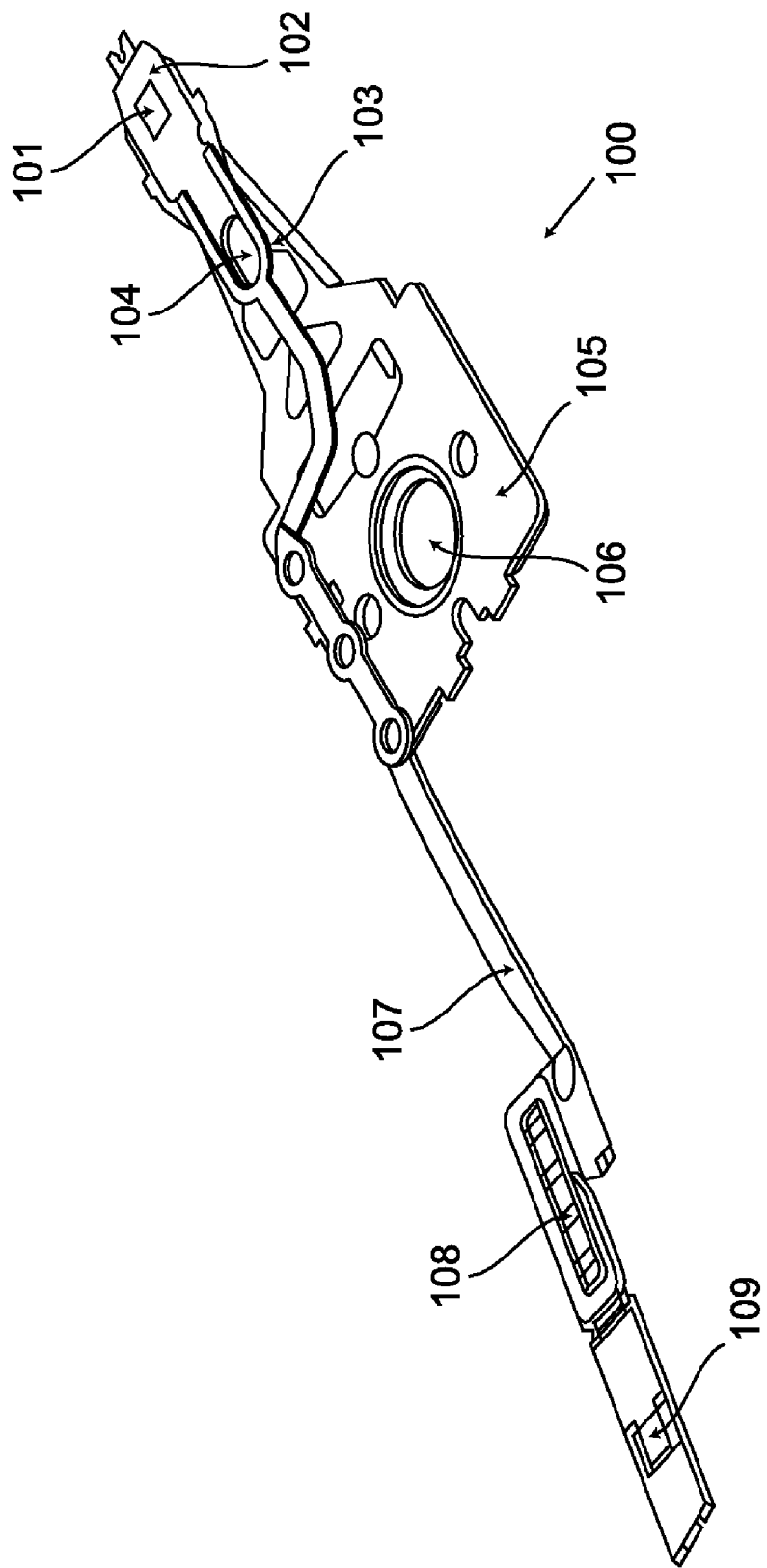
FIG. 1 shows a typical head gimbal assembly.

FIG. 1 shows a typical HGA 100 of the type testable by a spinstand. The HGA 100 has a magnetic read/write head 101 for reading from and writing to a disk. The head 101 is supported on a slider 102, which is aerodynamically shaped to "fly" the head 101 over the surface of a disk at an appropriate height for reading from and writing to a disk. The head 101 and slider 102 are attached to a suspension arm 103 or load beam. The suspension arm 103 provides suspension which is necessary when flying the head 101 over the disk surface. The suspension arm 103 also has a tooling slot 104 formed in it. The suspension arm 103 is attached to a base plate 105. The suspension arm 103 is slightly angled with respect to the base plate 105. The base plate 105 has a boss hole 106 in its centre by which the HGA 100 can be held. A flex circuit 107 runs from the head 101, is supported by the suspension arm 103 and base plate 105 and projects from the end of the base plate 105 opposite the head 101. The flex circuit 107 connects to the head 101 at one end 107a and terminates in electrical contacts 108 at its other end 107b (called the tail). These contacts 108 allow connections to be formed to the HGA 100 by the spinstand electronics. The heads 101 are very sensitive to electrostatic charge and are easily damaged by such. To prevent such damage, HGAs 100 are typically received from manufacturers with a shunt tab 109 attached, which short-circuits the electrical connections in the flex circuit 107 to guard against electrostatic charge build-up. This shunt tab 109 must be removed before the HGA 100 can be used to read or write data either in a spinstand for testing of the HGA 100 or when assembled into a head disk assembly.

Figure 2:
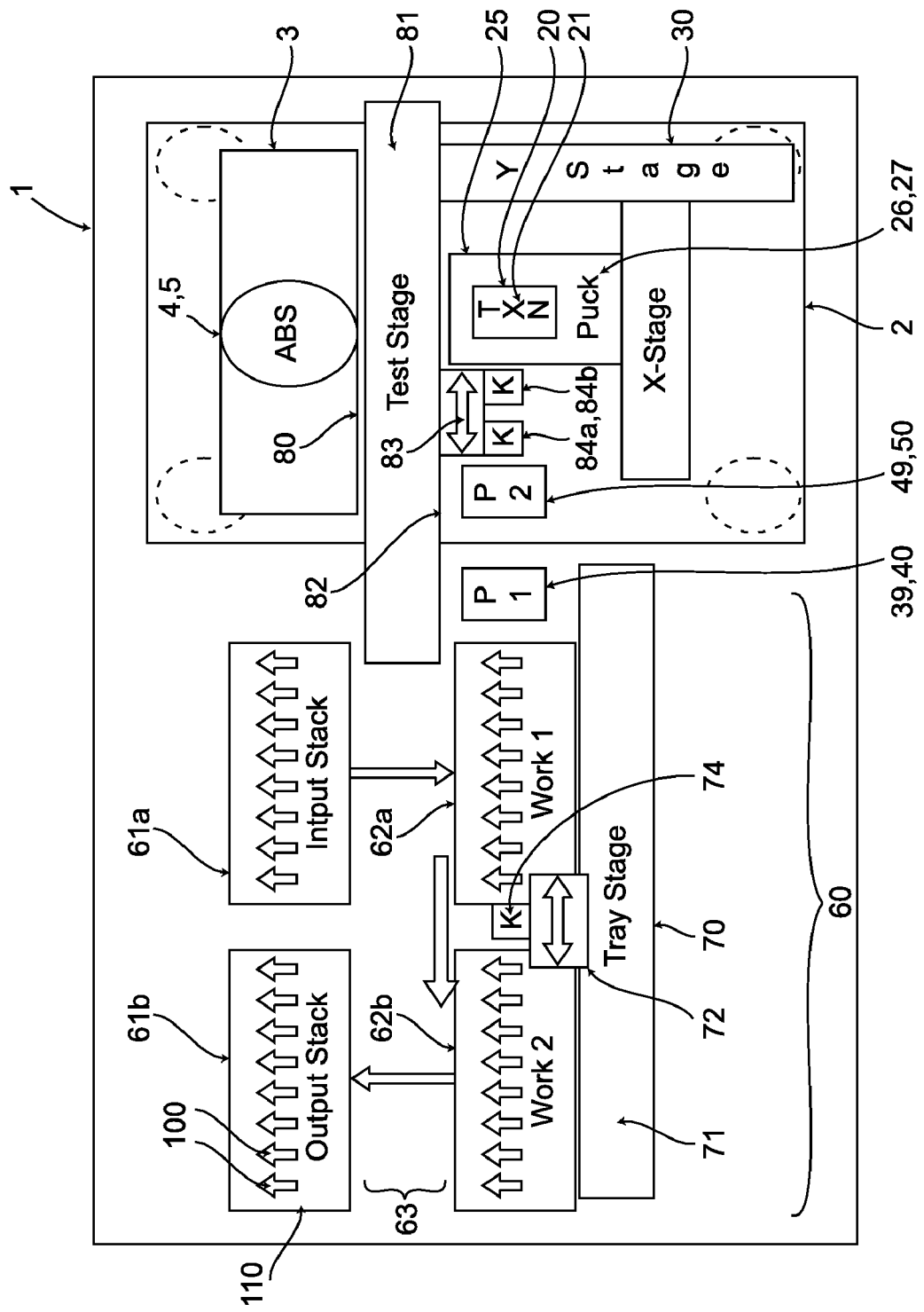
FIG. 2 shows schematically a plan view from above of an example of an apparatus for loading a head to a test apparatus according to an embodiment of the present invention.

Referring to FIG. 2, a spinstand 1 comprises a deck 2. The deck 2 is made from granite and has a highly polished surface. The deck 2 is mounted on isolation mounts (not shown) to isolate the spinstand 1 from external vibrations.

The spinstand 1 has a bridge 3 mounted to the deck 2. The bridge 3 supports a spindle assembly 4 for holding a disk 5 to be tested in an inverted configuration, i.e. such that the end of the spindle assembly 4 to which the disk 5 is fixed is lowermost.

Figure 3:
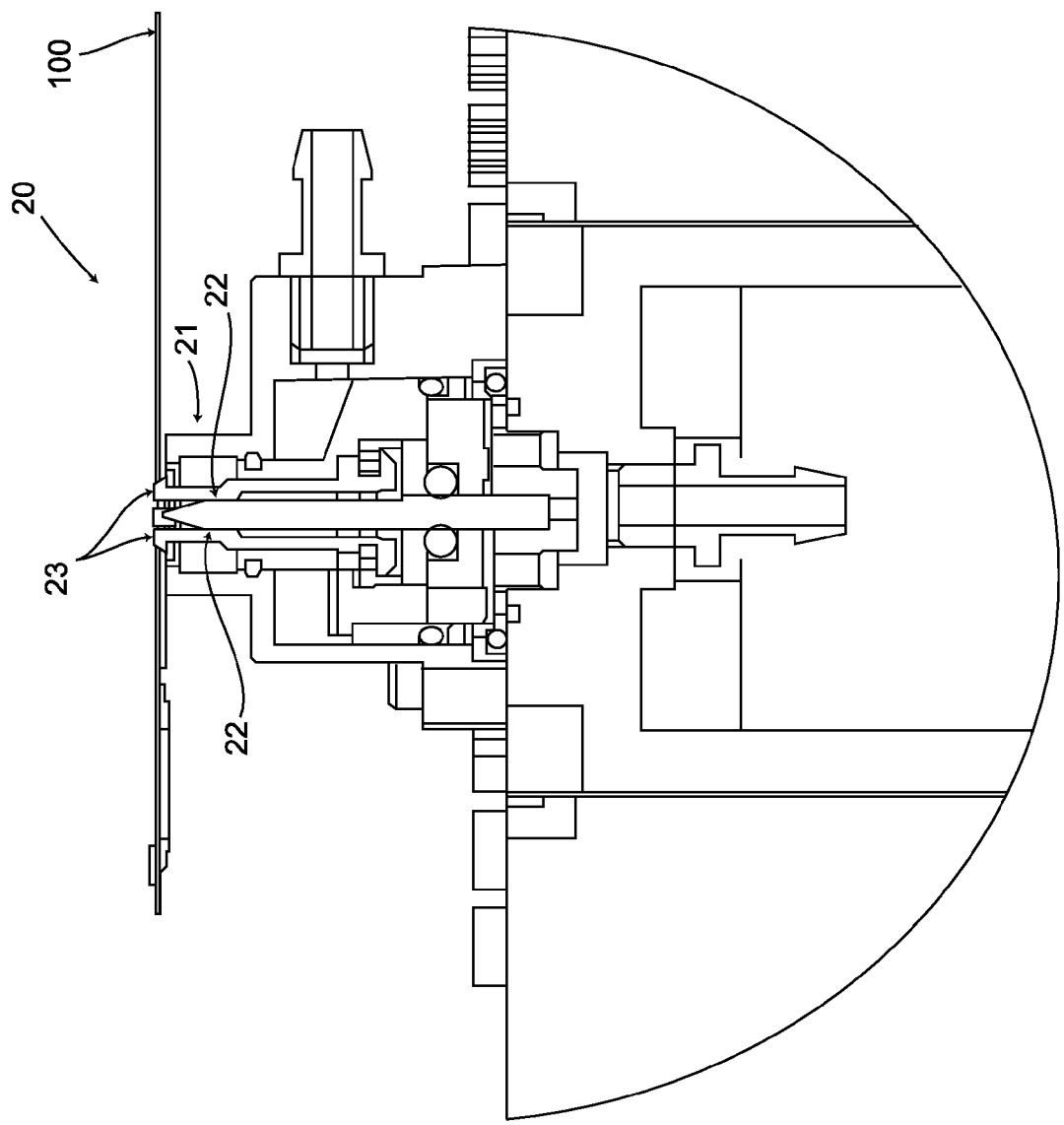
FIG. 3 shows a sectioned view of a test nest.

Referring to FIG. 2 in conjunction with FIG. 3, the spinstand 1 has a so-called "test nest" 20 which is adapted to hold a HGA 100 during testing and to make electrical connections from the spinstand electronics to the HGA electrical contacts 108. The test nest 20 has a collet mechanism 21 for holding the HGA 100. The collet mechanism 21 comprises a plurality of collet fingers 22 (four in this example) having radially outwardly projecting ears 23. The collet fingers 22 can be fired or actuated upwards, by for example a pneumatic actuator, the collet fingers 22 pivoting inwardly towards each other so as to be able to pass through the boss hole 106 in the base plate 105 of a HGA 100. The collet fingers 22 can then be retracted, by for example another pneumatic actuator, so that the collet fingers 22 open outwards again such that the ears 23 engage the base plate 105 around the boss hole 106 and to pull the base plate 105 against the test nest 20. To release the HGA 100, the collet fingers 22 are actuated upwards again to release the base plate 105.

The test nest 20 in one embodiment is mounted on a movable stage that is movable over the surface of the deck 2. In the embodiment shown in the drawings, the movable stage comprises a puck 25 which is mounted on the deck 2 by an air bearing (not shown), and is positioned by a highly accurate x-y positional stage 30, also supported by an air bearings (not shown) and having linear encoders (not shown) to allow the position of the puck 25 to be highly accurately determined. The puck 25 is capable of moving the head to a desired location with great precision. For example, the puck 25 is used during testing to move the head 101 under the surface of the disk 5 to a particular track on the disk 5. The puck 25 and the x and y elements of the x-y stage 30 can be locked down to the surface of the deck 2 by application of a vacuum. This helps prevent movement of the puck 25 when in a desired position. Other arrangements of the test nest 20 and the x-y positional stage 30 are possible. For example, a stacked arrangement is possible, where the test nest 20 is supported on a movable stage that is carried on top of the x-y positional stage 30, rather than having the test nest 20 on a puck 25 that is directly on top of the deck 2. Similarly, the x and y elements of the x-y positional stage 30 may be stacked one upon the other, rather than both being directly on top of the deck 2.

The puck 25 also has a load/unload mechanism (not shown) for loading/unloading the head 101 to/from the test surface of the disk 5 in order to position the head 101 at the correct z-height and to be horizontal for reading from and writing to a track of test data on the test surface of the disk 5. The puck 25 also has a nanopositioner (not shown) disposed between the puck 25 and the test nest 20, which allows very fine positional changes of the head 101 to be made relative to the test track.

The spinstand 1 also includes automation for receiving HGAs 100 and automatically positioning and loading the HGAs 100 to the test nest, as will be described below.

The HGAs 100 to be tested are delivered to the apparatus 1 arranged in trays 110. The HGAs 100 are normally arranged in a row of 10 or 20 HGAs 100 in each tray 110, each HGA 100 being positioned with the head 101 pointing upwards.

The spinstand 1 has a tray receiving stage 60 for receiving trays 110 of HGAs 100 to be tested. The tray receiving stage 60 has two banks 61a, 61b for holding stacks of trays 110. The operator can place a stack of trays 110 to be tested in the first bank 61a. The top tray 110 from the first stack 61a is delivered by automation 63 to the first bank working area 62a, from where the HGAs 100 in the tray 110 are processed by the apparatus 1. Once testing of the HGAs 100 in the tray 110 is finished, the tray 110 is then moved by the automation 63 to the second bank working area 62b and then to the bottom of the stack of trays 110 in the second bank 61b. The trays 110 are processed and moved in this way in turn by the apparatus 1 until the first stack 61a is depleted. The operator can then remove the stack 61b of trays 110 of tested HGAs 100 and load a new stack to the first bank 61a. Alternatively, new trays 110 can be added on an ad hoc basis to the top of the first bank 61a. The apparatus is also capable of operating in reverse, i.e. processing trays 110 from the second bank 61b and moving them to the first bank 61a.

Figure 4:
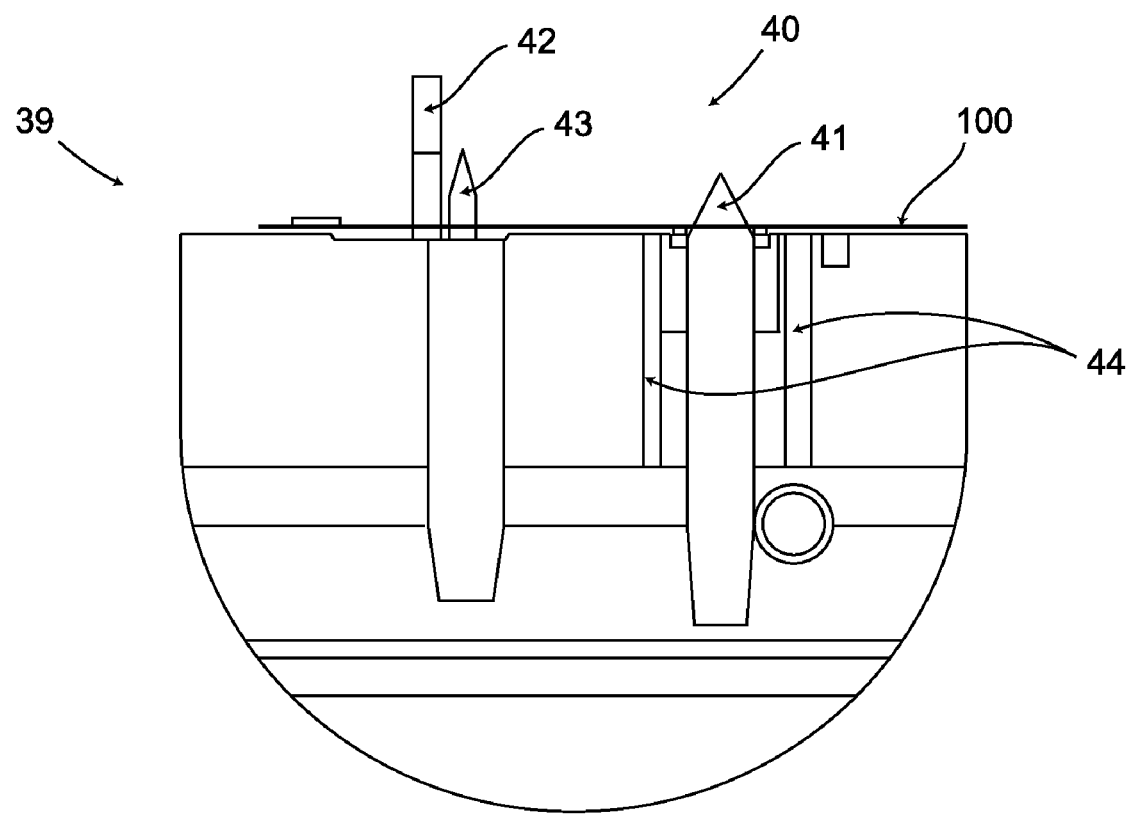
FIG. 4 shows a sectioned view of a first, coarse precisor.

Referring to FIG. 2 in conjunction with FIG. 4, the apparatus 1 also has a coarse precisor station 39. This is mounted away from the deck 2 of the spinstand 1. The coarse precisor station 39 has a coarse precisor 40 having a boss pin 41 and a pair of goalposts 42 (one being shown in the sectional view of FIG. 4) in the form of pins projecting upwards from the uppermost surface of the coarse precisor station 39. The boss pin 41 is tapered moving upwards away from the coarse precisor station 39, so as to be generally conical. The goalposts 42 converge towards each other moving towards the coarse precisor station 39. When a HGA 100 is appropriately placed onto the coarse precisor 41, the boss pin 41 engages with the boss hole 106 in the base plate 105 of the HGA 100, thereby positioning the HGA 100 in the x-y direction. The goalposts 42 accept the suspension arm 103 of the HGA 100 between them and give a rough theta positioning to the HGA 100 as the HGA 100 is advanced downward onto the coarse precisor 40, due to the converging goal posts 42 guiding the suspension arm 103 between them. A further pin 43 may be provided near the goalposts 42 for engagement with the tooling slot 104 of the HGA 100 in order to improve the positioning achieved with the coarse precisor 40. Also, vacuum ports 44 may be provided in the general location of the boss pin 41.

Low pressure can be applied to these ports 44 in order to hold the HGA 100 down on the coarse precisor 40 whilst the HGA 100 is waiting to be picked up by one or other of the first and second automated handlers 70, 80 discussed further below.

In an embodiment, deshunt and magnetic headset operations are carried out on the HGA 100 when located in the coarse precising station 39. Deshunt is the process of punching out the shunt tab 109, the shunt tab 109 being used to short circuit the terminals of the head 101 of the HGA 100 (as described above), so that the head 101 can be used to read/write data. Magnetic headset is the process of forming a powerful magnetic field around the head in order to set the direction of the magnetic domains of the read and write transducers of the head 101, so that the head 101 can be used to read/write data. The magnetic headset and deshunt operations can be carried out concurrently. These operations may be accomplished by any conventional means and are not described in detail herein.

The apparatus has a first automated handler 70 running above the tray receiving stage 60 and the coarse precising station 39. The first automated handler 70 includes a linear positioner 71 and a pick device 72, the pick device 72 being positionable at a transverse position along the linear positioner 71. The linear positioner 71 may for example be servo controlled, including linear encoders (not shown) for greater positional accuracy.

The pick device 72 comprises a kicker 73 and an end effector 74 disposed on the end of the kicker 73. The kicker 73 is capable via air actuation or a servo controlled motor or other appropriate actuator of moving the end effector 74 in the z-direction, allowing the end effector 74 to be vertically raised or lowered.

The end effector 74 has a generally flat and square lowermost surface having four vacuum ports generally adjacent each corner of the lowermost surface. These ports are connectable to a vacuum source. The ports are arranged so that they can be aligned with positions on the base plate 105 of a HGA 100.

Thus with a HGA 100 positioned beneath the pick device 72, the kicker 73 can be actuated to lower the end effector 74 to be in contact with or positioned closely above the base plate of the HGA 100. A vacuum can then be applied to the ports of the end effector 74 so that ambient air pressure causes the base plate to be forced against the lower surface of the end effector 74. Thus the HGA 100 is "vacuumed" or "suctioned" onto the end effector 74 to hold it in place. The kicker 73 can then be actuated upwards, thereby picking up the HGA 100. The first linear positioner 71 can then be actuated to move the pick device 72 and the HGA 100 transversely.

The first automated handler 70 is arranged so as to be able to pick up HGAs 100 from a tray 110 in the first work area 62a and transfer them to the coarse precisor 40. The coarse precisor 40 can accept HGAs 100 having a fairly large variation in their positioning and orientation and give them a more precise positioning. This is necessary because the position of the HGAs 100 in the trays 110 is very poorly controlled.

The tray stage 60, the first automated handler 70 and the coarse precising station 39 are positioned off of the deck 2. This helps isolate the spinstand 1 from vibration.

Figure 5:
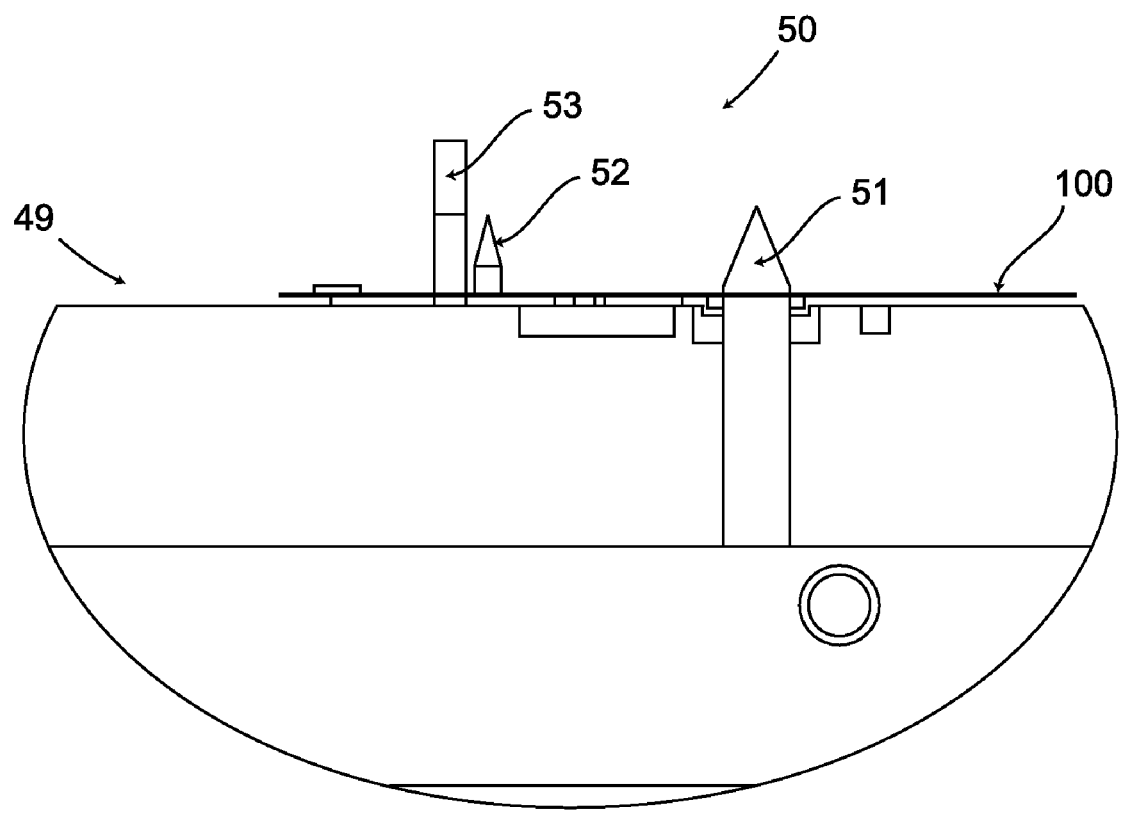
FIG. 5 shows a sectioned view of a second, fine precisor.

Referring to FIG. 2 in conjunction with FIG. 5, the apparatus 1 also has a fine precisor station 49 positioned on the deck 2. The fine precisor station 49 has a fine precisor 50 having a tapered boss pin 51 for engaging with the boss hole 106 of the base plate 105 of a HGA 100 and thereby positioning it in the x-y direction. The fine precisor 50 also has a tapered theta pin 52 for engaging with the tooling slot 104 of the suspension arm 103 of the HGA 100. Goalposts 53 (one being shown in the sectional view of FIG. 5) may also be provided to help guide the HGA 100 into the fine precisor 50. When a HGA 100 is placed onto the fine precisor 50, the boss pin 51 engages with the boss hole 106 of the HGA 100 and the theta pin 52 engages with the tooling slot 104 of the HGA 100, thereby finely positioning the HGA 100 in the x-y position and the theta directions. It should be noted that it is not generally necessary to provide vacuum ports on the fine precisor station 49 (like the vacuum ports 44 of the coarse precisor station 39) because the HGA 100 is not actually left on the fine precisor station 49 at any time. On the contrary, the HGA 100 is simply pushed down onto the fine precisor 50 to achieve the fine positioning that is required and then quickly raised again to be moved to the test nest 20 (as discussed below).

The apparatus has a second automated handler 80 running above the coarse precisor 40, the fine precisor 50 and the test nest 20. The second automated handler 80 includes a linear positioner 81 and a pick device 82, the pick device 82 being positionable at a transverse position along the linear positioner 81. The linear positioner 81 may for example be servo controlled including linear encoders (not shown) for greater positional accuracy. The linear positioner 81 of the second automated handler 80 (the second linear positioner 81) is more accurate than the linear positioner 71 of the first automated handler 70 (the first linear positioner 71) since it is required to position parts with greater accuracy.

The pick device 82 of the second automated handler 80 is similar to the pick device 72 of the first automated handler 70. However, whereas the first pick device 72 had one kicker (the first kicker 73) having a respective end effector (the first end effector 74), the second pick device 82 has two kickers 83a, 83b (the second and third kickers 83a, 83b), mounted side by side, each with a respective end effector 84a, 84b (the second and third end effectors 84a, 84b).

The second automated handler 80 is arranged so as to be able to pick up HGAs 100 from the coarse precisor 50 and transfer them to the fine precisor 40 and vice versa, and to pick up HGAs 100 from the fine precisor 40 and transfer them to the test nest 20 and vice versa. Since the test nest 20 is on the puck 25 and is itself movable by the x-y positioner 30, the test nest 20 has at least one predefined test nest load position where it can receive a HGA 100 from the second pick device 82. The second automated hander 80 is required to move each HGA 100 with high precision in order that the fine positioning of the HGA 100 achieved by the fine precisor 50 is not compromised when being moved to the test nest 20 for testing. To achieve this precision, the second automated handler 80 is short in the direction along which it moves the HGAs 100 and capable of higher precision compared with the first automated handler 70. In order to keep the second automated handler 80 as short as possible, the coarse precisor station 39, the fine precisor station 49 and the test nest load position are arranged close together. Moreover, in order to simplify the automation, the first and second tray bank working areas 62a, 62b, the coarse precisor 40, the fine precisor 50, the kickers 83a, 83b and the test nest 20 are all arranged to be collinear. The second automated handler 80 is mounted to the deck 2 in order to achieve a good registration between the fine precisor 50 and the test nest 20, which are also mounted to the deck 2.

In order to move a HGA 100 from a tray 110 in the tray load area to the test nest 20, the following steps are performed:

1. The first automated handler 70 moves to the tray receiving stage 60 and picks up an untested HGA 100 from a tray 110.
2. The first automated handler 70 moves to the coarse precisor station 39 and places the untested HGA 100 onto the coarse precisor 40.
3. The first automated handler 70 moves back to the tray receiving stage 60.
3. Magnetic headset and deshunt are performed on the untested HGA 100.
4. The second automated handler 80 picks up the untested HGA 100 from the coarse precisor 40 using the second kicker 83a and end effector 84a.
5. The second automated handler 80 moves to the fine precisor 50 and places the untested HGA 100 onto the fine precisor 50, giving the HGA 100 a fine positioning.
6. The second automated handler 80 picks up the HGA 100 from the fine precisor 50 and moves it to a position above the test nest 20, the collet 22 is fired and the untested HGA 100 is released from the second automated handler 80.
7. The puck 25 then moves the HGA 100 to the disk 5, the puck 25 is locked down, and all movement of the automated handlers 70, 80 is stopped while testing of the HGA 100 is performed.
8. After testing of the head 101 is completed, the puck 25 moves the HGA 100 back to its HGA load position and the tested HGA 100 is picked up by the third end effector 84b of the second automated handler 80.
9. The second automated handler 70 moves to the coarse precisor station 40 and places the tested HGA 100 on the coarse precisor 40 (note, the fine precisor 50 is by-passed when returning a tested HGA 100 to the tray load stage).
10. The first automated handler 70 moves to the coarse precisor station 39 and picks up the tested HGA 100.
11. The first automated handler 70 moves to the tray stage and places the tested HGA 100 back in a tray 110.

Because the pick device 82 of the second automated handler 80 has two separate kickers 83a, 83b with respective end effectors 84a, 84b and is therefore capable of holding two HGAs 100 at the same time, it is possible to overlay two HGA load/unload cycles so that the steps described above are performed for two HGAs 100 concurrently. This allows the cycle time of testing a HGA 100 to be reduced. In particular, whilst a first HGA 100 is being tested, a second untested HGA 100 is waiting in position in the coarse precisor station 39. Once testing of the first HGA 100 is complete, the second automated handler 80 moves the second pick device 82 to the coarse precisor station 39 and picks up the untested HGA 100 from the coarse precisor 40 using the second kicker 83a and end effector 84a. The untested HGA 100 is then moved on and off the fine precisor 50 to give a fine positioning to the untested HGA 100. The second automated handler 80 then moves the second pick device 82 to the test nest load/unload position and picks up the tested HGA 100 with the third kicker 83b and end effector 84b. The second automated handler 80 then places the untested HGA 100 onto the test nest 20 with the second kicker 83a and end effector 84a. Whilst the untested HGA 100 is moved to and loaded to the disk 5, the tested HGA 100 is returned to the tray stage via the steps described above and a new HGA 100 is moved from the tray 110 to the coarse precisor 40.

Embodiments of the present invention have been described with particular reference to the example illustrated. However, it will be appreciated that variations and modifications may be made to the examples described within the scope of the present invention.

The invention claimed is:

1. Apparatus for loading a read/write head to a spinstand, the apparatus comprising:
   a load area for receiving at least one head to be tested;

a first station having a coarse precisor arranged to provide a coarse positioning of the head;

a first automation device arranged to pick a said head from the load area and to deliver it to the coarse precisor;

a deck having a test station at which a said head can be tested, the deck having a fine precisor arranged to provide a second, fine positioning of the head and the deck having a second automation device arranged to pick a said head from the first station and deliver it to the fine precisor where the head can be subjected to a second, fine precising and to pick a said head from the fine precisor and to deliver it to the test station.

2. Apparatus according to claim 1, wherein the load area and the first automation device are mechanically isolated from the deck.

3. Apparatus according to claim 1, wherein the first station is mechanically isolated from the deck.

4. Apparatus according to claim 1, wherein the deck has a movable stage thereon that holds the test station, the movable stage being movable from a first position on the deck where a said head can be tested to a second position on the deck for receiving a said head from the first automation device.

5. Apparatus according to claim 4, wherein the movable stage comprises a puck that can be locked down to the deck by application of a vacuum between the puck and the deck.

6. Apparatus according to claim 1, wherein the first station has a magnetic headset apparatus by which a said head can be magnetically headset when a said head is received by the coarse precisor.

7. Apparatus according to claim 1, wherein the first station has a deshunt device by which a said head can be deshunted when a said head is received by the coarse precisor.

8. Apparatus according to claim 1, wherein the first station has a tapered pin for registering with a boss hole in the base plate of a head gimbal assembly in which a said head is incorporated, and two splayed pins for receiving and guiding the suspension arm of a said head gimbal assembly there between.

9. Apparatus according to claim 1, wherein the fine precisor comprises a first tapered pin for being received in the boss hole of the base plate of a head gimbal assembly in which a said head is incorporated, and a second tapered pin for being received in the tooling slot of a said head gimbal assembly.

10. A method of loading a read/write head to a spinstand, the spinstand comprising a deck, the method comprising:
  1) transferring the head from a load area to a first station using a first automation device, the first station being a coarse precisor, the load area and the first automation device both being isolated from the deck and the coarse precisor being mounted to the deck;
  2) performing a coarse precising operation on the head using the coarse precisor;
  3) transferring the head from the coarse precisor to a fine precisor using a second automation device, the fine precisor and the second automation device being mounted to the deck;
  4) performing a fine precising operation on the head using the fine precisor; and,
  5) transferring the head from the fine precisor to a test station mounted to the deck using the second automation device.

11. A method according to claim 10, comprising performing a deshunt operation on the head at the first station.

12. A method according to claim 10, comprising performing a magnetic headset operation on the head at the first station.

13. A method according to claim 10, wherein the steps of claim 10 are performed in the literal order 1) to 5) in relation to a single head.

14. A method according to claim 13, wherein a first head and a second head are processed concurrently by the spinstand, steps 1) and 2) being performed on the first head concurrently with steps 3), 4) and 5) being performed on the second head.

* * * * *

UNITED STATES PATENT AND TRADEMARK OFFICE
CERTIFICATE OF CORRECTION

PATENT NO. : 7,520,047 B2  
APPLICATION NO. : 11/517570  
DATED : April 21, 2009  
INVENTOR(S) : Graham Collins et al.

It is certified that error appears in the above-identified patent and that said Letters Patent is hereby corrected as shown below:

Column 10, line 6, cancel the text beginning with "10. A method of loading a read/write head to a spinstand," to and ending "device." in column 10, line 23, and insert the following claim:

--10. A method of loading a read/write head to a spinstand, the spinstand comprising a deck, the method comprising:
 1) transferring the head from a load area to a first station using a first automation device, the first station being a coarse precisor, the load area and the first automation device both being isolated from the deck and the coarse precisor being mounted away from the deck;
 2) performing a coarse precising operation on the head using the coarse precisor;
 3) transferring the head from the coarse precisor to a fine precisor using a second automation device, the fine precisor and the second automation device being mounted to the deck;
 4) performing a fine precising operation on the head using the fine precisor; and,
 5) transferring the head from the fine precisor to a test station mounted to the deck using the second automation device.--

Signed and Sealed this
Fifteenth Day of March, 2011

David J. Kappos
*Director of the United States Patent and Trademark Office*